United States Patent
Zhang et al.

(10) Patent No.: US 7,228,539 B2
(45) Date of Patent: Jun. 5, 2007

(54) METHOD AND APPARATUS FOR UPDATING INTER-SERVER COMMUNICATION SOFTWARE

(75) Inventors: Ruihua Zhang, Naperville, IL (US); Hong Shao, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 706 days.

(21) Appl. No.: 10/462,477

(22) Filed: Jun. 16, 2003

(65) Prior Publication Data
US 2004/0255287 A1   Dec. 16, 2004

(51) Int. Cl.
*G06F 9/44* (2006.01)
*G06F 15/177* (2006.01)

(52) U.S. Cl. .................. 717/171; 717/177; 709/221
(58) Field of Classification Search ............... None
See application file for complete search history.

(56) References Cited

U.S. PATENT DOCUMENTS

| 5,790,664 | A  | * | 8/1998 | Coley et al. ............... 709/203 |
| 6,199,204 | B1 | * | 3/2001 | Donohue .................... 717/178 |
| 6,263,370 | B1 | * | 7/2001 | Kirchner et al. ............ 709/230 |
| 6,892,320 | B1 | * | 5/2005 | Roush ......................... 714/15 |
| 2002/0031125 | A1 | * | 3/2002 | Sato ............................ 370/394 |

* cited by examiner

*Primary Examiner*—Tuan Dam
*Assistant Examiner*—Chrystine Pham

(57) ABSTRACT

A method and apparatus for updating inter-server communication software in a network are provided. More particularly, the invention is directed to a technique for software updating of servers that reduces the unavailability of network resources due to the update process. In this regard, the method includes the implementation of proxy software in servers that are to be updated. The servers are then selectively updated (e.g. one server at a time) in a manner, using the proxy software, to allow the servers to communicate with one another during the entire update process.

19 Claims, 5 Drawing Sheets

METHOD AND APPARATUS FOR UPDATING INTER-SERVER COMMUNICATION SOFTWARE

BACKGROUND OF THE INVENTION

This invention relates to a method and apparatus for updating inter-server communication software in a network. More particularly, the invention is directed to a technique for software updating of servers that reduces the unavailability of network resources due to the update process. In this regard, the method includes the implementation of proxy software in servers that are to be updated. The servers are then selectively updated (e.g. one server at a time) in a manner, using the proxy software, to allow the servers to communicate with one another during the entire update process.

While the invention is particularly directed to the art of updating or upgrading inter-server communication software, and will be thus described with specific reference thereto, it will be appreciated that the invention may have usefulness in other fields and applications. For example, the invention may be used in any software application requiring on-line updates owing to interface protocol changes in a network where it is desirable to maintain resource availability at a high level.

By way of background, software updating or upgrading (or retrofitting in cases where the updating causes system down time or outage), typically involves a procedure to convert, or move, software from one version to another version. In a live system, "bug fixes" and/or "patches" are typically applied to remove software defects from an old version of software. In a telecommunication system, software updating is also a means for service providers to increase their revenue by introducing new features in the field to the end-users.

A major concern in executing a software update (SU) procedure for a live running system in a network is that new software activation typically requires a server, or a group of servers, to be completely offline for a period of time. Thus, the system must necessarily run with reduced capacity, or the system may experience full or partial outages.

Further, a software update procedure may need to be executed many times in a year in order to provide new features or new software enhancements to end users of the network. Because of the reduced capacity caused by each update procedure, a network service provider could significantly reduce its ability to generate revenue.

Accordingly, it is desirable to implement software updates so that the system resources remain highly available during the upgrade process. That is, the impact of the update procedure on the system should be kept to minimal or negligible levels. To achieve these objectives, conventional communication systems are typically designed with a N+K (K>=1) load-sharing configuration, where N is a minimum number of servers required for the offered system capacity. Therefore, the full capacity can always be maintained with N servers, if the update procedure is applied one server at a time.

However, the N+K load-sharing configuration also usually requires that two versions (the new, updated version and an older version) of software co-exist during software update in a multi-server communication system. The reason for this is that software inter-version operability must be maintained. That is, it is important that the servers being updated are able to communicate with one another during the update procedure—even if all of the servers are not updated with the same version of the software at any given time. If both versions of the software were not loaded on each server, one or more updated servers that run on the new version of the software will not be capable of communicating with the rest of the servers that are still running on the old version. Moreover, the system requires a complete shut down when the update is started and the new version of the software is fully activated.

Heretofore, inter-server operability was not achievable in the absence of the above server configuration (which includes both versions of the software). In this regard, the inter-server communication protocol may vary from one version of the software to the next version of the software. For example, the message length, version or message format may vary from one version of software to another version. As such, to avoid loading multiple versions of software on the servers, the software update must be executed with all servers being offline at the same time. This has the obvious disadvantage that no service can be provided during the upgrade process—which may take many hours. Alternatively, at least half of the total servers are taken offline for update while other half are still in service. In the later case, a switch-over takes place after first half has completed the update. This, of course, is problematic because the system has be offline during switch-over interval, and for the most of time, the system operates at 50% of full capacity.

The present invention contemplates a new and improved technique that resolves the above-referenced difficulties and others. For example, the present invention provides a method and apparatus of upgrading inter-server communication protocol software—one server at a time. Based upon the approach mentioned in the invention, the capacity degradation can be avoided. Therefore, current invention provides a framework for achieving high system availability, by reducing the planned system downtime, during the update procedure.

SUMMARY OF THE INVENTION

A method and apparatus for upgrading inter-server communication software in a network are provided.

In one aspect of the invention, a method for updating software in a multi-server network includes setting a timer, or timer value, for an update procedure, incorporating the set of conversion rules into a proxy routine based on differences between a first version and a second version of software, installing a proxy routine in each server to be updated, selectively updating the plurality of servers with the second version of the software during the time interval, processing data in the network by servers to be updated with the second version and servers updated with the second version based on selective implementation of the proxy routine, and disabling the proxy routine in each server upon expiration of the timer.

In another aspect of the invention, the method comprises determining the differences between the first version of the software and the second version of the software.

In another aspect of the invention, the method comprises defining the set of conversion rules based on the differences.

In another aspect of the invention, a method comprises steps of determining whether the update procedure is active, converting data of a first version received by an updated server from the network to data of a second version if the update procedure is active, processing the data of the second version by the updated server, converting data generated in an application process of the updated server from the second version to data of the first version if the update procedure is active, and sending the data of the second version from the updated server to the network.

In another aspect of the invention, a system comprises a means for incorporating a set of conversion rules in a proxy routine, a means for installing the proxy routine in each server to be updated, means for selectively updating the plurality of servers with the second version of the software during running of the timer, means for processing data in the network by servers to be updated with the second version and servers updated with the second version based on selective implementation of the proxy routine, and means for disabling the proxy routine in each server upon expiration of the timer.

In another aspect of the invention, a system comprises a means for determining whether the update procedure is active, means for converting data of a first version received by an updated server from the network to data of a second version if the update procedure is active, means for processing the data of the second version by the updated server, means for converting data generated in an application process of the updated server from the second version to data of the first version if the update procedure is active, and means for sending the data of the second version from the updated server to the network.

In another aspect of the invention, the means for determining whether the update procedure is active includes a timer.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
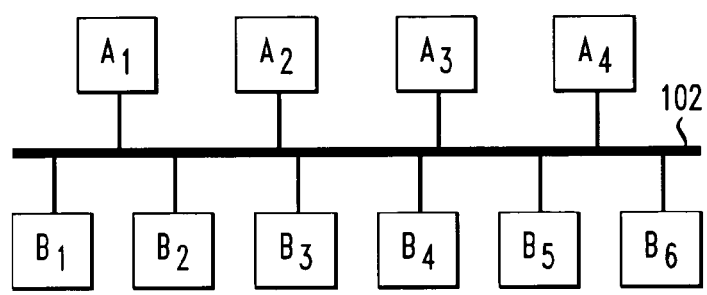
FIG. 1 is a block diagram of a network into which the present invention may be incorporated.

Referring now to the drawings wherein the showings are for purposes of illustrating the preferred embodiments of the invention only and not for purposes of limiting same, FIG. 1 provides a representative view of an overall system or network into which the present invention may be incorporated. FIG. 1 shows a typical multi-server communication system 100 that comprises different type of servers, A and B. A-type servers (e.g. $A_1$, $A_2$, $A_3$, and $A_4$) and B-type servers (e.g. $B_1$, $B_2$, $B_3$, $B_4$, $B_5$, and $B_6$) are typically connected via a Local Area Network (LAN) 102. The A-type servers and B-type servers may, and typically do, perform different functions. For example, the A-type servers may process signaling and control messages while the B-type servers process user traffic. It is desirable in such a multi-server environment that the servers communicate with each other using the same version of interface protocol that enables application message interchanges between servers, e.g. A-type server sends control messages to instruct one of the B-type servers to setup a user session for a service request. In general, one A-type server may select any one of the B-type servers for service. Likewise, a B-type server may respond to a service request from any one of the A-type server. All A-type servers must use the same interface protocol and same version of the protocol as the B-type servers to communicate with a B-type server. The software update as illustrated in this invention is typically applied to the interface protocol upgrade between A and B-type servers, but it should be applicable to the upgrade only among A or B-type servers. It should also be understood that the communications being referenced are communications that occur within the noted exemplary system 100, as opposed to communications with the public network.

Figure 2:
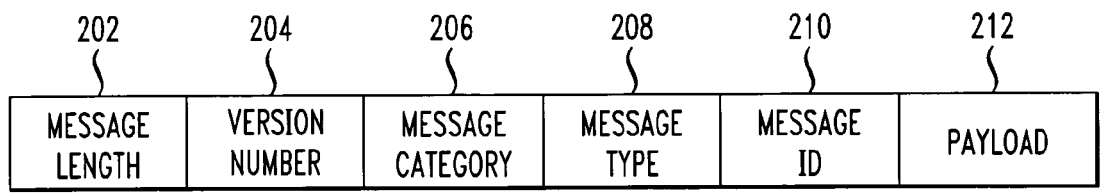
FIG. 2 is a representative view of an application message carried in UDP/IP protocol.

FIG. 2 shows an example of an application message 200 carried by UDP/IP, or User Datagram Protocol/Internet Protocol (also called UDP socket for interprocessor communication (IPC)). This format is illustrative of a type of inter-server communication protocol that is used to allow the servers to communicate with one another. As shown, a header includes a Message Length 202 that indicates the length of the entire message. This field is used to verify if a complete message is read in an actual call. A Version Number 204 indicates the application message version. A Message Category 206 indicates which of the different types of messages that may be carried between processors, such as OAM, session activation or deactivation messages, etc. A Message Type 208 includes a message type definition file. A Message ID 210 is used to correlate request and response within an application. This field is also used as a sequence number. A payload 212, which follows the header, contains data specific to the message type.

Formats embodying other types of inter-server communication protocols may differ in the number or type of information fields, content of the information fields or a combination of these differences. For example, a different inter-server communication protocol may implement a header that does not include a Message Type field or it may use different values in its version of a Message Type field.

It is an objective of the present invention to allow a maximum number of servers to operate and communicate with one another within a system that is undergoing a software update. To do so, the present invention implements a software update proxy function program (SUPF).

Briefly, the software update proxy function (SUPF) program or proxy routine is a program or routine that preferably functions between the UDP layer and the application process of a server within a multi-server communication system. The SUPF routine converts an old version application message to a new version application message, or vice versa (if necessary). A set of conversion rules is predefined and implemented based on differences between the old version of the software and the new version of the software. Typically, the software update is planned and tested by the implementers.

More specifically, the conversion rules relate to differences in the format of the messages, or the inter-server communication protocol, provided for in each version of the software, such as those noted above.

The SUPF routine is installed in each server via an installation procedure that is associated with the new software being installed on the servers. The installation procedure is harmless to the system operation, and it can be performed while the system is still in operation. The SUPF routine becomes active when the updated server upon which the SUPF routine is installed goes online after being off-line during the update procedure performed thereon. The lifetime of the SUPF routine is determined via a timer function. The SUPF routine is disabled after the timer expires. The value of the timer is provisionable via a system Operations, Administration & Maintenance (OA&M) interface.

Figure 6:
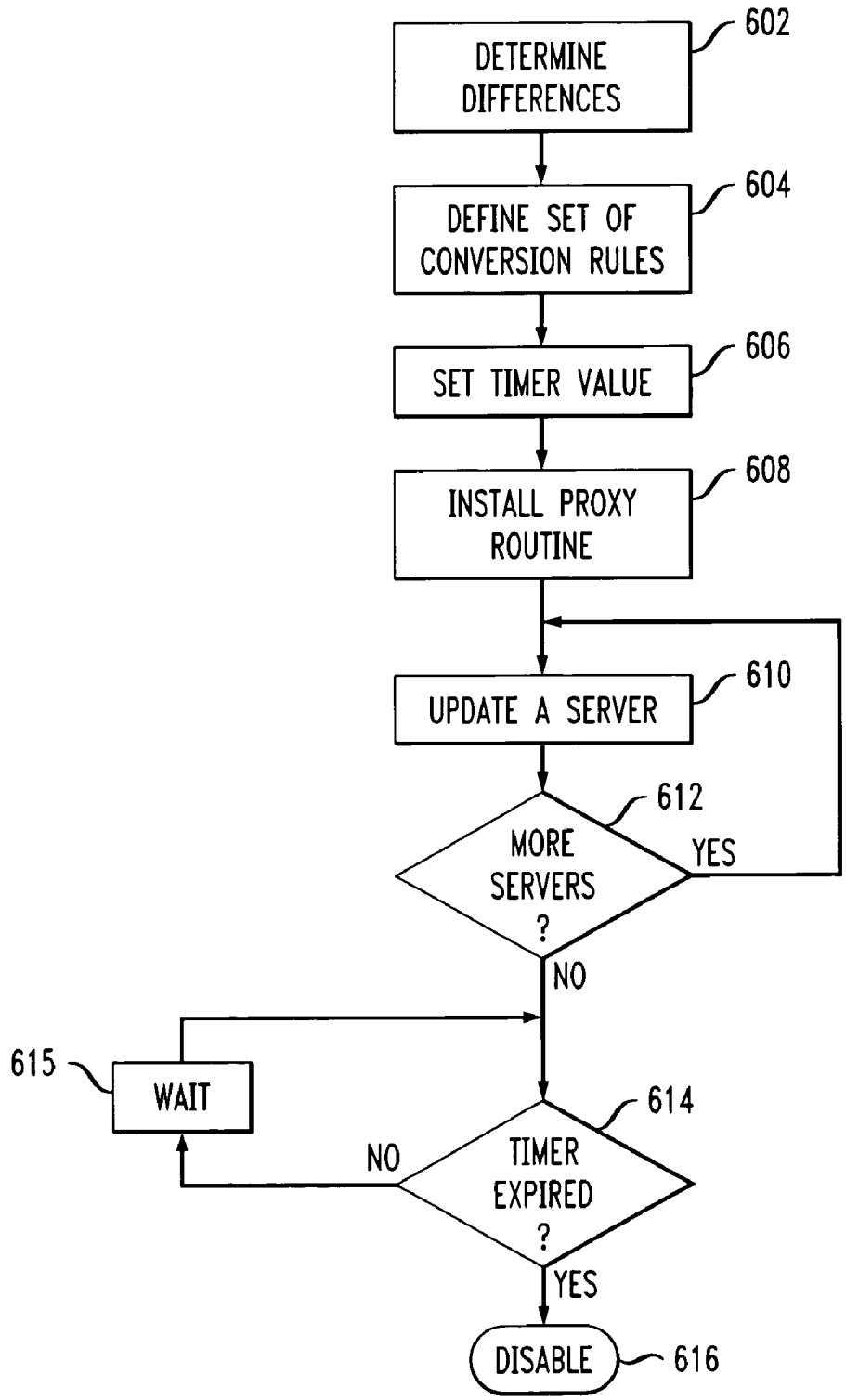

More particularly, referring now to FIG. 6, a method 600 is illustrated. The method 600 is directed to the software update procedure according to the present invention. As shown, an initial determination is made as to the differences between the two versions of the protocol required by the two versions of the software (step 602). These differences are typically determined by software designers; however, it may well be automated processes that can be implemented to make these determinations. Based on the differences, a set of conversion rules for updating is defined (step 604). As those of skill in the art will understand, these conversion rules will differ from application to application. For example, the conversion rules should take into account the number or type of information fields and the content of the information fields and the messages used in the protocol so that such differences can be accounted for in the new version of the software. As noted above, it may be that a message-type field is not included in the new version of the software. In this case, the conversion rules would simply provide storage space for such a field and enter a default value in the field. This default value will then be recognized by the appropriate server. As a further example, if different values are simply used in different versions of a software package, a mathematical conversion from one value to another value could be. accomplished by the conversion rules. It is to be appreciated that the conversion rule can be implemented in a variety of different manners using various and well known software techniques.

Once the conversion rules are determined, a timer, or timer value, is set (step 606). The time value is based on an amount of time required for all the servers to be updated plus an additional time period. In this manner, the timer should be set to a value as follows:

Timer>[number of servers]×[time period of each server update]

Next, the SUPF, or proxy, program are then installed to each server to be updated (step 608). Each of the servers is then selectively updated by taking that server offline, activating the software, and rebooting the server when the update process is complete (step 610). It is then determined whether there are any other servers to be updated (step 612). If so, the previous step is simply repeated. If not, the timer is checked (step 614). If the timer is not expired, the routine waits (step 615) and repeats step 614. If the timer is expired, the proxy routine in all servers is disabled (step 616).

Again, it is an objective of the present invention to allow a maximum number of servers to operate and communicate with one another within a system that is undergoing a software update. The above procedure defines the software update procedure that takes place in a system. The following discussion provides greater detail on the continuing operation of the system during the software update.

Figure 3:
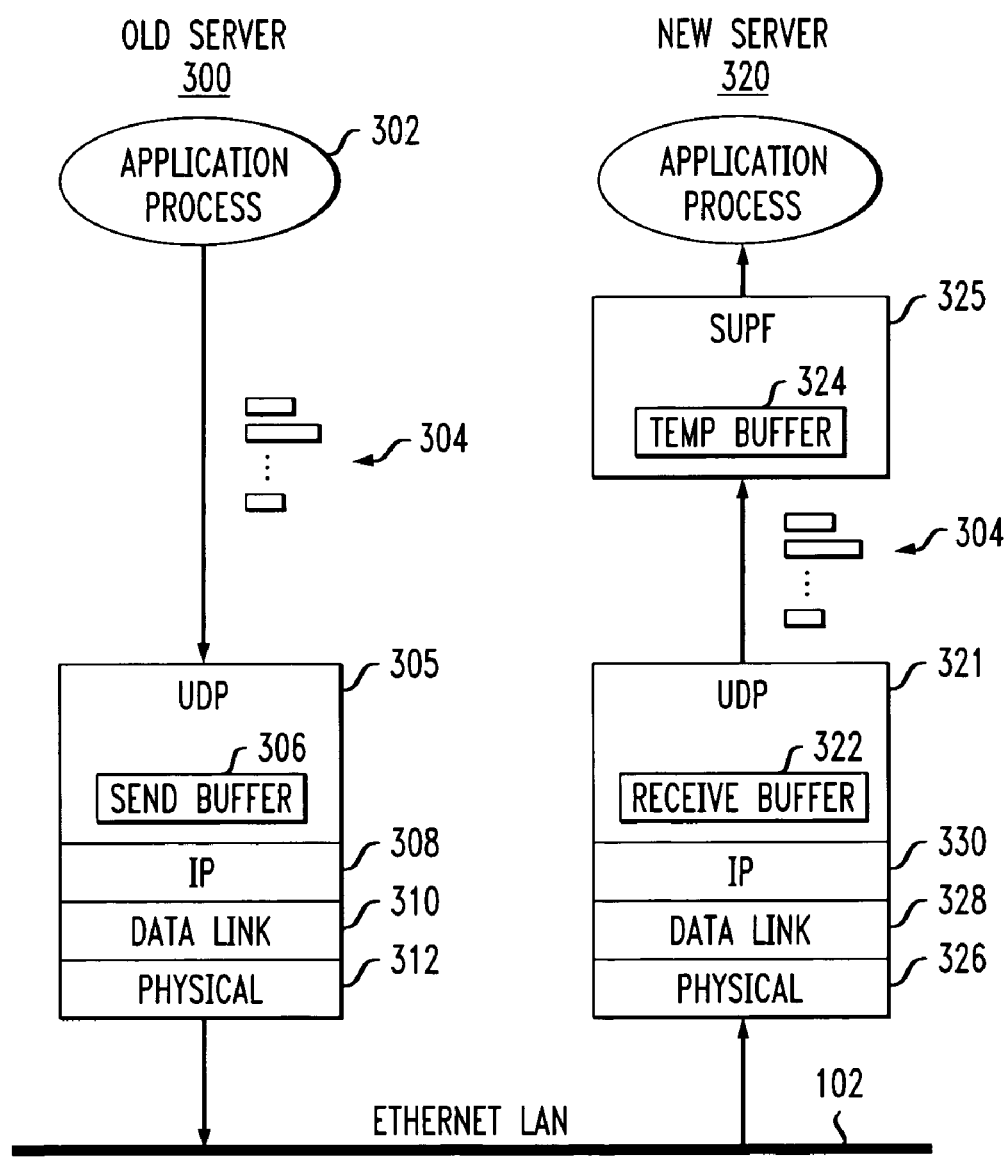
FIG. 3 is a functional block diagram illustrating aspects of the present invention.

In this regard, FIG. 3 shows a portion of the system 100 and how the message flows from an old version server 300 to a new version server 320 (only one direction is shown here). In the old version server, the application process 302 writes the application payload 304 to the UDP send buffer 306 of the UDP layer 305, and further transmits the payload 304 via a LAN 102 (e.g. an Ethernet LAN) to the new server 320. It should be understood that the application payload 304 is transmitted from the send buffer 306 of the UDP layer 305 to the IP layer 308, data link 310, and physical connection 312. At the server 320, the payload 304 is transmitted through the physical connection 326 to the data link layer 328, and further to the IP layer 330. The payload is then stored in the receive buffer 322 of the UDP layer 321 of the server 320. In the new server, the SUPF first reads the message from UDP receive buffer 322 and checks the message version. Of course, it can do so by simply reading the version number data within the header of the message (see FIG. 2, for example). If this is a new version message, the message is directly written to a Temp buffer 324 (of the SUPF 325) without any changes, and then application process reads from the Temp buffer 324 for further processing. If incoming message is old version, the message must then be converted to a new version format before it is written to the Temp buffer 324.

As noted above, FIG. 3 illustrates one direction of data flow. It should be appreciated that each server is operative to receive and send data during the update procedure. It should be further understood that the data that flows on the Ethernet LAN 102, will always be data of a format of the old version of the software. It is not until all servers are updated with a new version of the software that the new version of the software is used to communicate. In this way, a server that has not been updated has the ability to read the data that is being transmitted.

Figure 4:
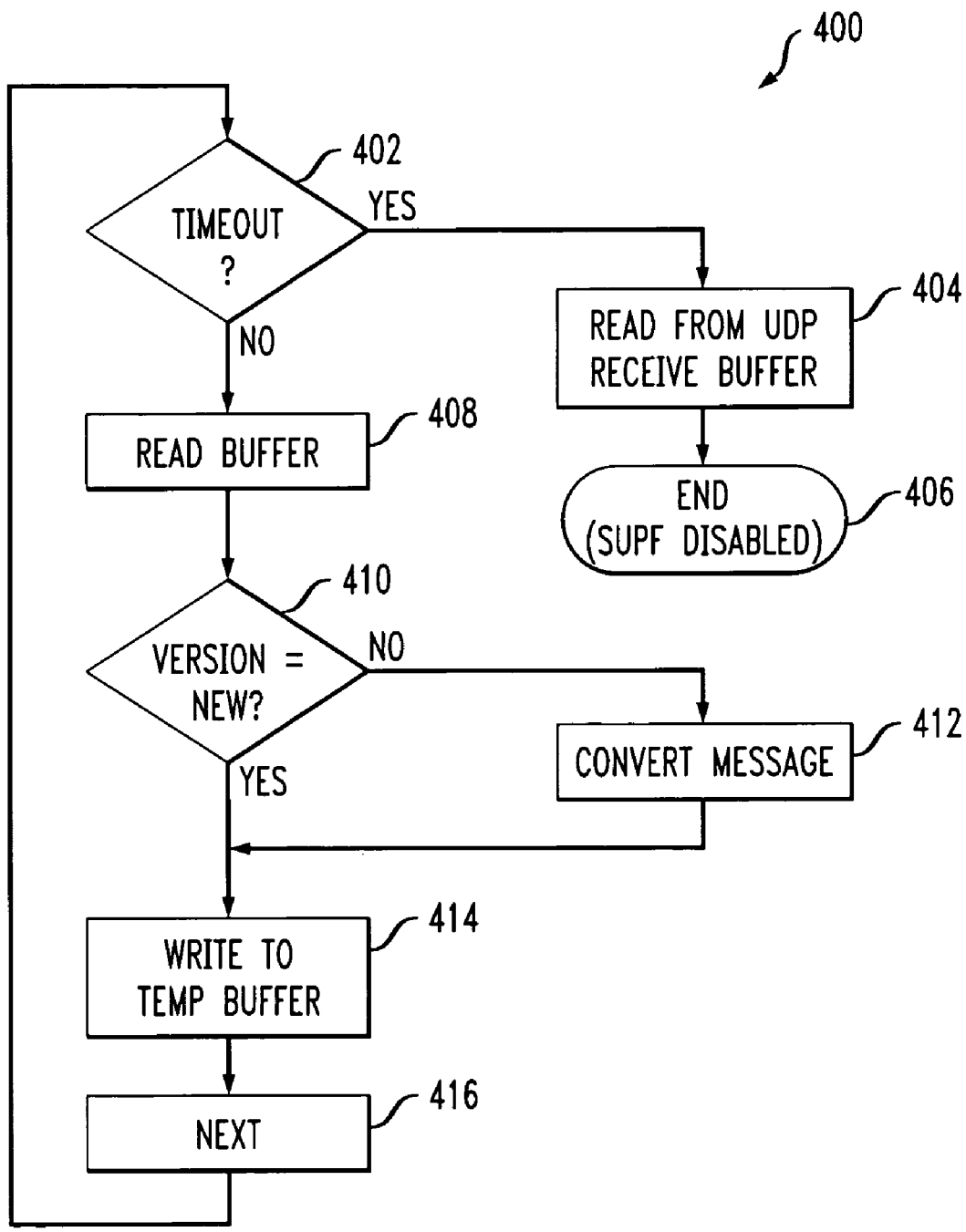
FIG. 4 is a flow chart illustrating a method according to the present invention.
Figure 5:
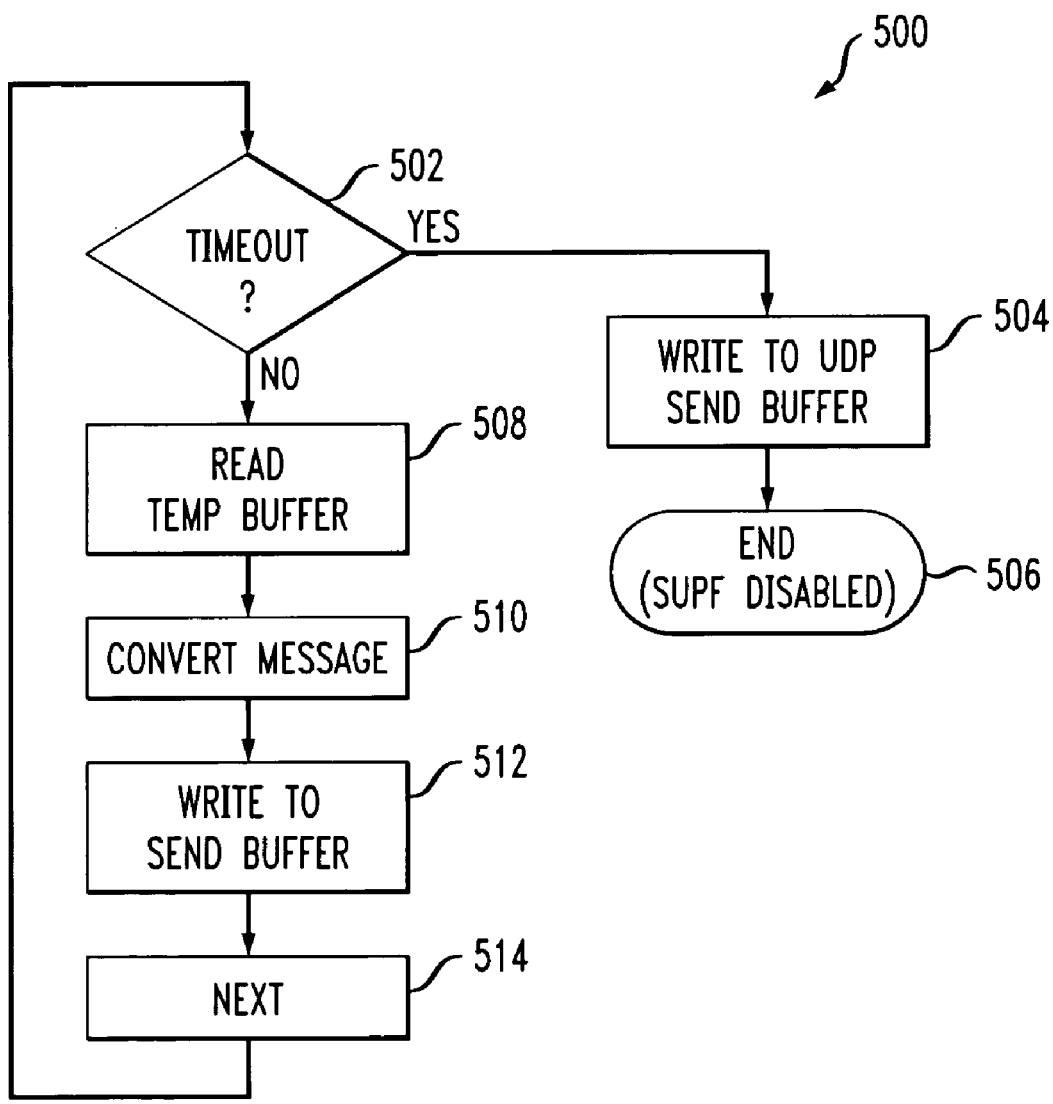
FIG. 5 is a flow chart illustrating a method according to the present invention; and, FIG. 6 is a flow chart illustrating a method according to the present invention.

FIGS. 4 and 5 illustrate the operation logic for reading and sending operations of the SUPF program. It should be understood that these processes are performed on servers which have been updated with the new software. Because the data flowing on the data link between the servers is always an old version during the update procedure, there is no need for any special treatment of data for servers that have not yet been updated with the new version software.

FIG. 4 is a flow chart of SUPF READ operation logic. As shown, a method 400 includes a determination 402 as to whether a preset timer has expired. If so, the application process is directed to read from the UDP receive buffer (step 404). The routine is then ended (step 406). If, on the other hand, the timer has not expired, the buffer is read (step 408). A determination is then made as to whether the version of software is the new version (step 410). If not, the message is converted (step 412) and written to a temporary buffer (step 414). If the software version is a new version, the data is simply written directly to the temporary buffer. The routine then simply awaits the next data transmission (step 416).

FIG. 5 is a flow chart of SUPF SEND operation logic. As shown, a method 500 determines whether a timer has expired (step 502). If so, the application process is instructed to write to the ULDP Send buffer (step 504) and the routine is ended (step 506). If the timer has not expired, a temporary buffer is read (step 508). The message is then converted (step 510) and written to the send buffer (step 512). The routine then simply waits for further data transmission (step 514).

For a fallback, after the update procedure is complete, the procedure is similar to the above. A Software Fallback Proxy Function (SFPF) is defined in the same manner to convert the existing version to the previous one. However, if a fallback procedure becomes necessary while the update procedure is still occurring, the servers that had been updated are simply returned to the old version and the proxy routine is simply disabled. Because only old version data is communicated on the links between the servers, this is an efficient way to handle fallback.

The methods and techniques of the present invention were suitably implemented in a system using software and hardware techniques that are apparent upon a reading of this disclosure. Of course, it is to be appreciated that a variety of such hardware and software techniques may be implemented to achieve the objectives of the invention.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for updating software in a multi-server network for processing data, the network including a plurality of servers having at least a first version of software, the method comprising steps of:
    setting a timer for an update procedure;
    incorporating a set of conversion rules in a proxy routine based on differences between the first version of the software and a second version of the software;
    installing the proxy routine in each server to be updated;
    selectively updating the plurality of servers with the second version of the software during running of the time;
    processing data in the network by servers to be updated with the second version and servers updated with the second version based on selective implementation of the proxy routine; wherein the processing comprises: (a) converting data of the first version received by an updated server from the network to data of the second version if the update procedure is active; (b) processing the data of the second version by the updated server; (c) converting data generated in an application process of the updated server from the second version to data of the first version if the update procedure is active; and disabling the proxy routine in each server upon expiration of the timer.

2. The method as set forth in claim 1 further comprising determining the differences between the first version of the software and the second version of the software.

3. The method as set forth in claim 2 further comprising defining the set of conversion rules based on the differences.

4. The method as set forth in claim 1 wherein the setting is based on an expected time to update all servers plus a predetermined additional time.

5. The method as set forth in claim 1 wherein the processing comprises:
    determining whether the update procedure is active based on the timer; and,
    sending the data of the second version from the updated server to the network.

6. The method as set forth in claim 5 wherein the converting of data of the first version includes reading the data from a buffer, converting the data, and writing the data to a second buffer.

7. The method as set forth in claim 5 further comprising reading data from a receive buffer if the update procedure is not active.

8. The method as set forth in claim 5 wherein the converting of data generated in the application process comprises reading the data generated in the application process from a buffer, converting the data, and writing the data to a second buffer.

9. The method as set forth in claim 5 further comprising writing the data generated in the application process to a send buffer if the update procedure is not active.

10. A system for updating software in a multi-server network for processing data, the network including a plurality of servers having at least a first version of software, the system comprising:
    means for incorporating a set of conversion rules in a proxy routine, said proxy routine being based on differences between the first version of the software and a second version of the software;
    means for installing the proxy routine in each server to be updated;
    means for selectively updating the plurality of servers with the second version of the software during running of a timer;
    means for processing data in the network by servers to be updated with the second version and servers updated with the second version based on selective implementation of the proxy routine; wherein the processing means includes: (a) means for converting data of the first version received by an undated server from the network to data of the second version if the update procedure is active; (b) means for processing the data of the second version by the undated server; (c) means for converting data generated in an application process of the undated server from the second version to data of the first version if the update procedure is active; and
    means for disabling the proxy routine in each server upon expiration of the timer.

11. The system as set forth in claim 10 wherein the processing means includes:
    means for determining whether the update procedure is active based on the timer; and
    means for sending the data of the second version from the updated server to the network.

12. A method for processing data by servers operating in a network during an update procedure, the method comprising steps of: determining whether the update procedure is active;
    converting data of a first version received by an updated server from the network to data of a second version if the update procedure is active;
    processing the data of the second version by the updated server;
    converting data generated in an application process of the updated server from the second version to data of the first version if the update procedure is active; and,
    sending the data of the second version from the updated server to the network.

13. The method as set forth in claim 12 wherein the determining is based on a timer.

14. The method as set forth in claim 12 wherein the converting of data of the first version includes reading the data from a buffer, converting the data, and writing the data to a second buffer.

15. The method as set forth in claim 12 further comprising reading data from a receive buffer if the update procedure is not active.

16. The method as set forth in claim 12 wherein the converting of data generated in the application process comprises reading the data generated in the application process from a buffer, converting the data, and writing the data to a second buffer.

17. The method as set forth in claim 12 further comprising writing the data generated in the application process to a send buffer if the update procedure is not active.

18. A system for processing data by servers operating in a network during an update procedure, the system comprising:

means for determining whether the update procedure is active;

means for converting data of a first version received by an updated server from the network to data of a second version if the update procedure is active;

means for processing the data of the second version by the updated server; means for converting data generated in an application process of the updated server from the second version to data of the first version if the update procedure is active; and, means for sending the data of the second version from the updated server to the network.

19. The system as set forth in claim 18 wherein the means for determining whether the update procedure is active includes a timer.

* * * * *